United States Patent [19]

Sato

[11] Patent Number: 5,054,709

[45] Date of Patent: Oct. 8, 1991

[54] TAPE CASSETTE REEL HAVING UPPER FLANGES MOLDED THEREWITH

[75] Inventor: Masanori Sato, Miyagi, Japan

[73] Assignee: Sony Corporation, Tokyo, Japan

[21] Appl. No.: 407,043

[22] Filed: Sep. 13, 1989

[30] Foreign Application Priority Data

Oct. 31, 1988 [JP] Japan .................................. 63-275326

[51] Int. Cl.$^5$ ............................................ B65H 75/18
[52] U.S. Cl. ................................................. 242/71.8
[58] Field of Search ...................... 242/71.8, 71.9, 199, 242/197, 68.4, 68.5, 118.61

[56] References Cited

U.S. PATENT DOCUMENTS 2,247,881 7/1941 Hatfield ................................ 242/71.8
3,993,262 11/1976 Longworth ........................... 242/71.8

FOREIGN PATENT DOCUMENTS 0136504 4/1985 European Pat. Off. ........... 242/71.8
2135653 9/1984 United Kingdom ............... 242/71.8

Primary Examiner—Daniel P. Stodola
Assistant Examiner—John P. Darling
Attorney, Agent, or Firm—Philip M. Shaw, Jr.

[57] ABSTRACT

On a tape cassette reel in which upper and lower flanges are integrally molded on upper and lower ends of a reel hub, the upper flange is formed in correspondence with an opening portion through the lower flange, and a protrusion is formed on an outer peripheral portion of the upper flange. This protrusion extends the effective radius of the upper flange so that the complete length of the magnetic tape is guarded against slippage even when the magnetic tape is fully wound around the reel hub.

20 Claims, 4 Drawing Sheets

TAPE CASSETTE REEL HAVING UPPER FLANGES MOLDED THEREWITH

BACKGROUND OF THE INVENTION

1. Field of the Invention

The present invention relates generally to tape cassette reels and, more particularly, is directed to a tape cassette reel for use with a video tape cassette or the like.

2. Description of the Prior Art

In a video tape cassette, a pair of tape reels is housed within a cassette body and a magnetic tape is wound around the hubs of the pair of tape reels, with each end of the magnetic tape fixed to one of the respective reel hubs. Upper and lower flanges are formed on upper and lower ends of each reel hub so that the magnetic tape wound around the reel hub does not slip widthwise.

Prior art methods of molding the hub and flanges as a single piece suffered from limitations which allowed the tape to slip out of place widthwise on the hub (described below). To combat this problem, the upper and lower flanges are generally formed separately. More specifically, the upper flange is formed on the reel hub, with which the lower flange is integrally joined by means of an ultrasonic welding-process or the like. This process of molding the upper and lower flanges and then joining them complicates the manufacturing of the tape cassette reel.

In order to simplify the manufacturing process of tape cassette reels, the following tape reel is proposed in which the upper and lower flanges are molded together with the reel hubs, yet which prevents the magnetic tape from slipping off of the hubs. This proposed upper-and-lower-flange-integral-type tape cassette reel is disclosed in Japanese Laid-open Utility Model No. 58-22308.

In FIGS. 1 and 2, reference numeral 1 generally designates a tape cassette reel, molded of a synthetic resin or the like. Reference numeral 2 designates a reel hub around which a magnetic tape (not shown) is wound. Upper and lower flanges 4 and 3 are integrally molded to the upper and lower ends, respectively, of the reel hub 2.

The lower flange 3 is formed as a disk shape and guards the full length of the magnetic tape wrapped around the reel hub 2. Engaging teeth 5 are formed on the periphery of the lower flange 3 so that they may engage a locking member (not shown) provided at the cassette housing side, thereby locking the reel hub 2. The upper flange 4, on the other hand, is formed as a fan shape extending for a predetermined angle of arc around the circumference. In this embodiment, three upper flanges 4 are molded on the upper end of the reel hub 2 at intervals of about 120 degrees.

In this tape reel 1, opening portions 6 are formed through the lower flange 3 so as to allow portions of the metal mold to pass through and form the upper flanges 4.

As shown in FIG. 3, this tape cassette reel 1 is molded by injecting a melted synthetic resin into a cavity formed between upper and lower metal mold cores 7 and 8. Protruding portions 9 are provided on the lower metal mold core 7 so as to penetrate the lower flange 3. The horizontal cross-section of each of the protruding portions 9 is fan-shape, and the upper flange 4 is molded along the reel hub 2 by the protruding portion 9. Simultaneously, the protruding portions 9 cause the fan-shaped openings 6 to be formed in the lower flange 3. The protruding portions 9 of the metal mode core are provided with "drafts" to enable the upper and lower metal mold cores 7 and 8 to be released from each other with ease. Therefore, the upper flange 4 is formed slightly smaller in size than the opening portion 6.

In the tape cassette reel thus formed according to the prior art, the shape of the opening portion 6 of the lower flange 3 corresponds directly to the shape of the upper flange 4 so that, when the draft of the metal mold core and the strength of the lower flange are taken into consideration, the outer diameter of the upper flange 4 can not be increased more than a predetermined value. Because of this, when a magnetic tape T of the standard length is fully wound around the reel hub 2, as shown in FIG. 4, the upper flange 4 can not guard the whole wound length of the magnetic tape T.

When the tape cassette is shaken or vibrated inadvertently, the magnetic tape T wound around the reel hub 2 may slip past the upper flange 4 (see FIG. 5), causing the magnetic tape T to be damaged.

OBJECTS AND SUMMARY OF THE INVENTION

Accordingly, it is an object of the present invention to provide an improved tape cassette reel which can remove the defects encountered with the prior art.

More specifically, it is an object of the present invention to provide a tape cassette reel which can prevent a magnetic tape from slipping off from the reel hubs.

It is another object of the present invention to provide a tape cassette reel which can prevent a magnetic tape from being damaged when the tape cassette is inadvertently subjected to shock or vibration.

It is still another object of the present invention to provide a tape cassette reel which can be manufactured with ease by a synthetic resin molding process.

It is further object of the present invention to provide a tape cassette reel which is suitable for application as a video tape cassette.

According to an aspect of the present invention, there is provided a tape cassette reel in which lower and upper flanges are integrally molded on upper and lower ends of a reel hub and said upper flange is formed in correspondence with an opening portion formed through said lower flange comprising:

a protrusion of predetermined shape formed on an outer peripheral portion of said upper flange.

These and other objects, features and advantages of the present invention will become apparent in the following detailed description of a preferred embodiment, when read in conjunction with the accompanying drawings in which like reference numerals are used to identify the same or similar elements.

DETAILED DESCRIPTION OF A PREFERRED EMBODIMENT

Now, an embodiment of a tape cassette reel according to the present invention will hereinafter be described with reference to FIGS. 6-10. In FIGS. 6-10, like parts corresponding to those of the prior-art tape cassette reel shown in FIGS. 1-5 are marked with the same references; therefore, their explanation will not be repeated in detail.

Figure 6:
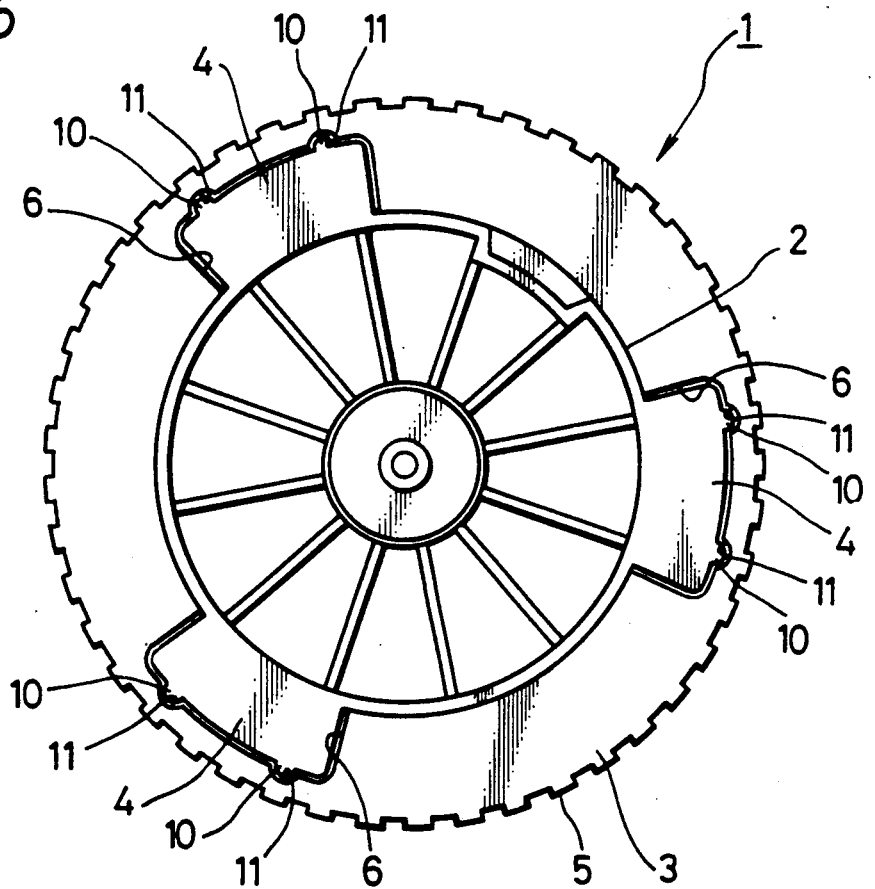
FIG. 6 is a plan view of an embodiment of a tape cassette, reel according to the present invention.
Figure 7:
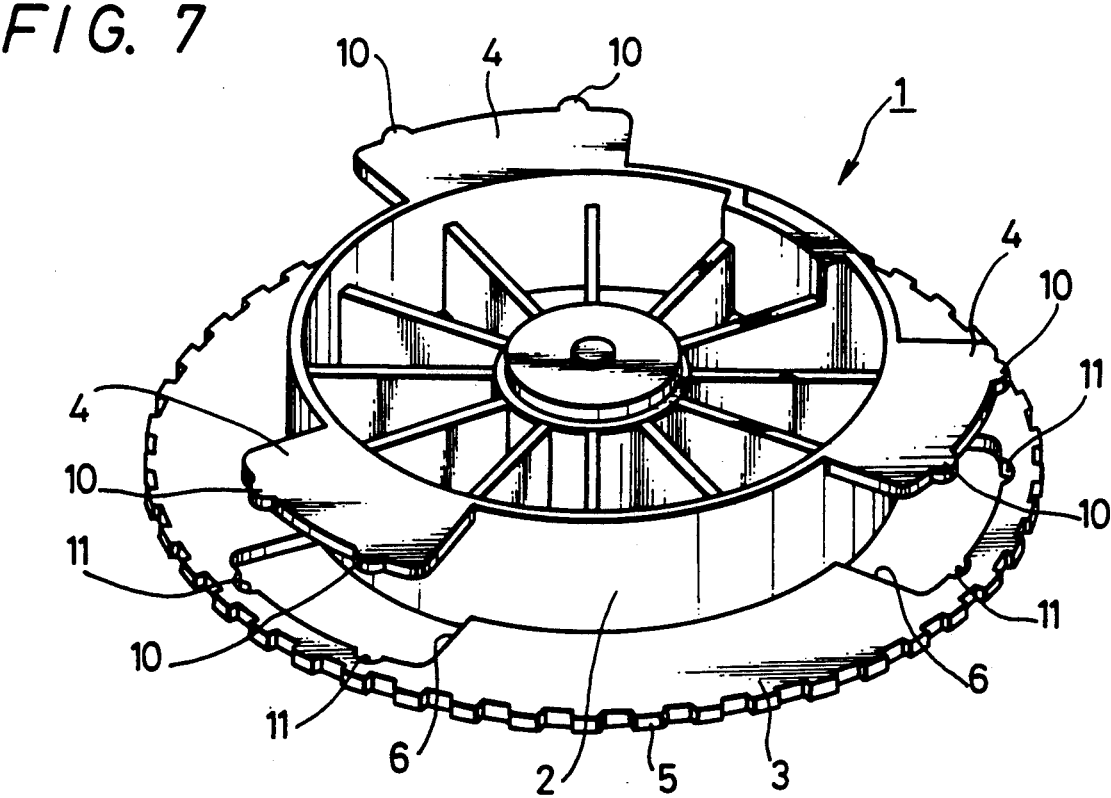
FIG. 7 is a perspective view thereof.

According to the tape cassette reel of the present invention, a protrusion 10 is formed on the outer peripheral portion of the upper flange 4, as in FIG. 6. The size of the protrusion 10 is selected s that all the diameter of the magnetic tape T wound around the reel hub 2 is guarded by the flange 4 and the protrusion 10. According to the present invention, the protrusion 10 is selected to be semicircular shaped and is formed on every upper flange 4 at two positions spaced a predetermined distance apart. In conjunction with the formation of the protrusions 10, concave portions 11 of a shape corresponding to that of the protrusions 10 are formed on the opening portion 6 of the lower flange 3.

Figure 8:
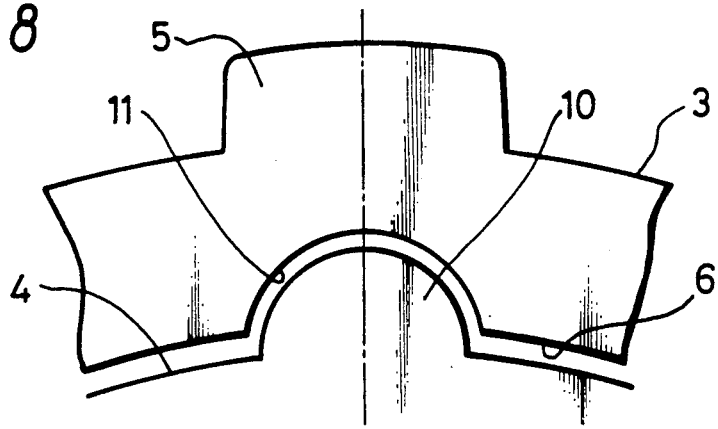
FIG. 8 is an enlarged, plan view of a critical portion of the tape cassette reel shown in FIG. 6.

Each protrusion 10 is formed on the upper flange 4 at such a position that its center is substantially aligned with the center of an outwardly convex portion of the engaging teeth 5 formed around the outer periphery of the lower flange 3, as shown in FIG. 8.

Figure 1:
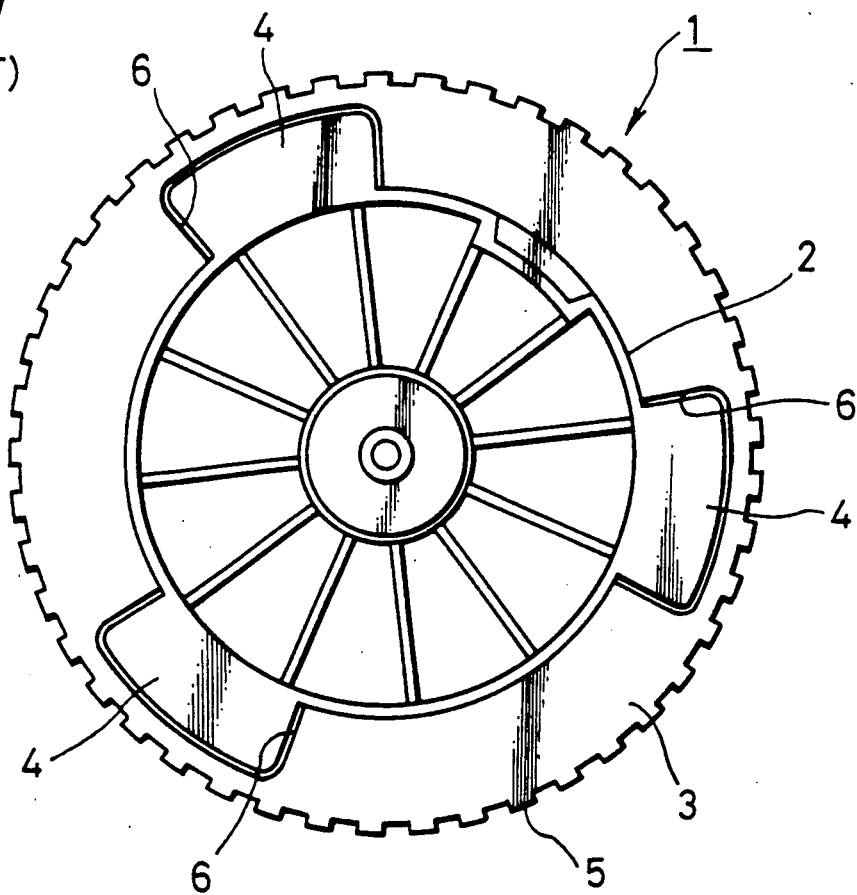
FIG. 1 is a plan view of a tape cassette reel according to the prior art.
Figure 2:
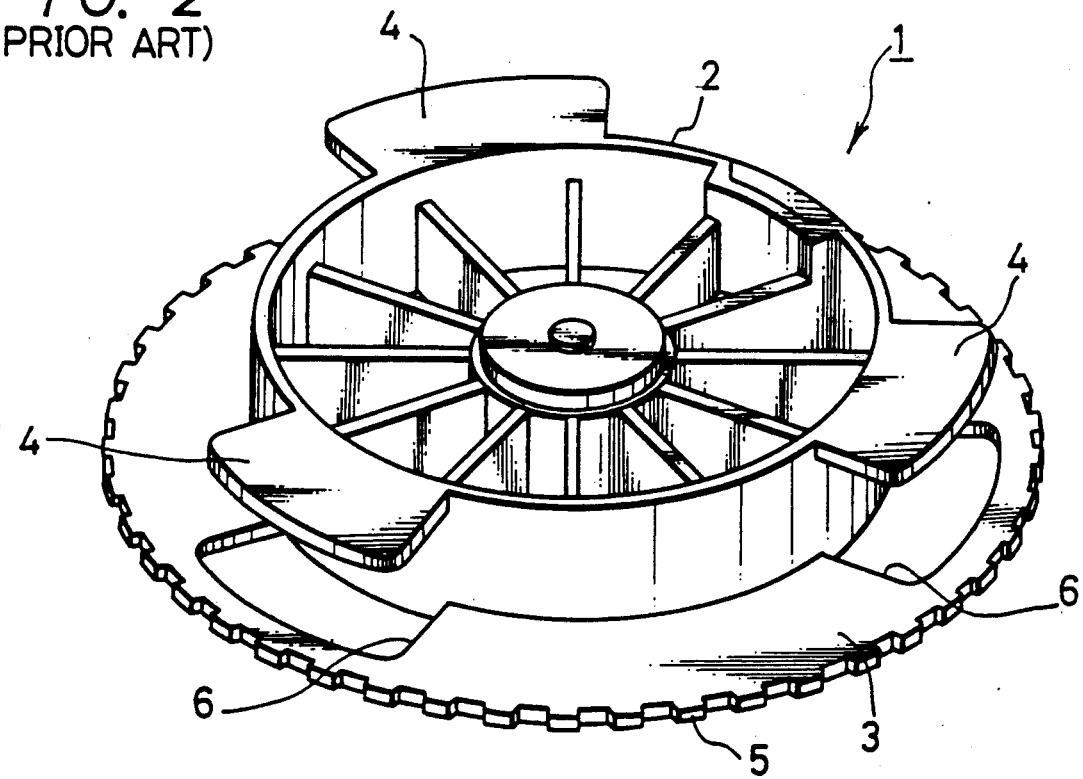
FIG. 2 is a perspective view thereof.
Figure 3:
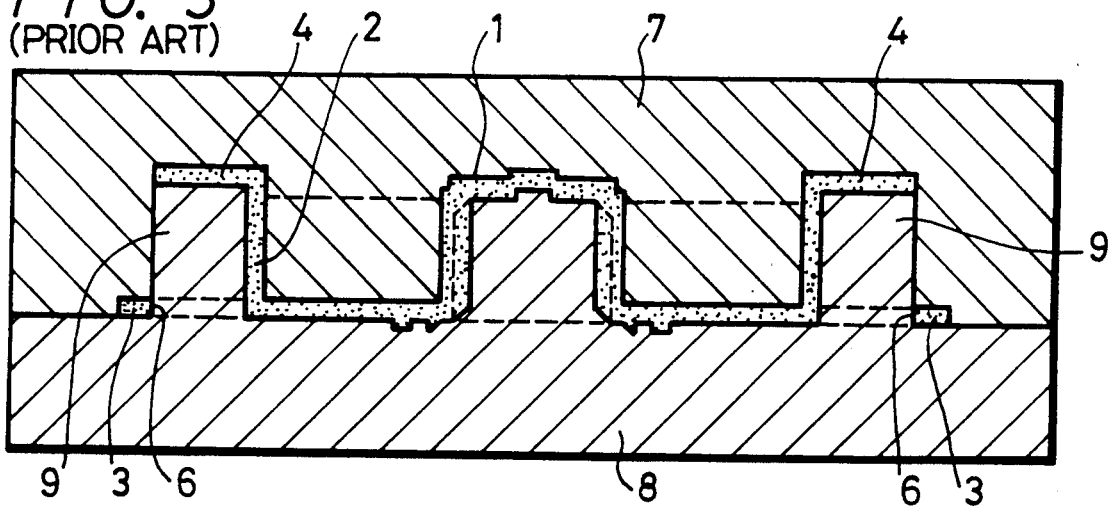
FIG. 3 is a longitudinal cross-section view of a metal mold core used to mold the tape cassette reel shown in FIG. 1.
Figure 4:
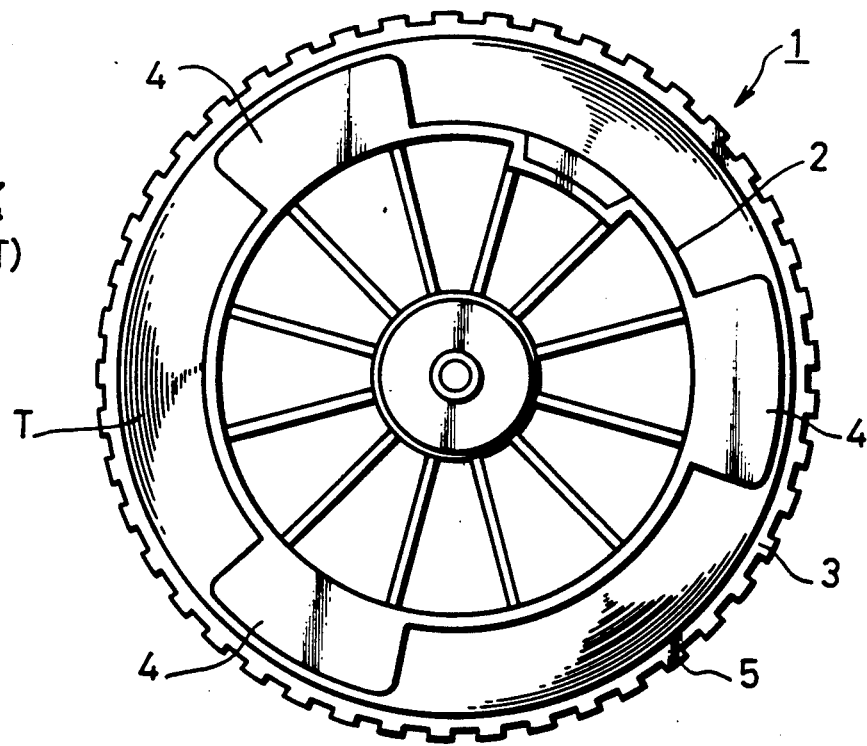
FIG. 4 is a plan view of a tape cassette reel according to the prior art, showing a magnetic tape wound around the reel hub.
Figure 5:
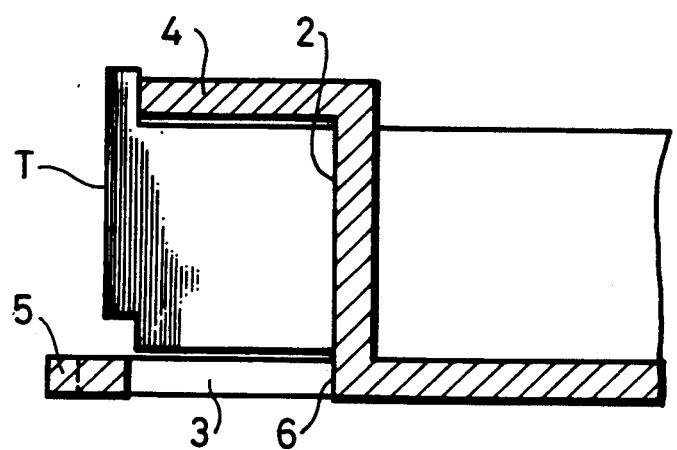
FIG. 5 is a longitudinal, cross-section side view of a main portion of the tape cassette reel depicted in FIG. 4.

The protrusion 10 of the upper flange 4, and the concave portion 11 of the opening portion 6, can be formed with ease by slightly modifying the shape of the metal mold cores 7 and 8 shown in FIG. 3.

Figure 9:
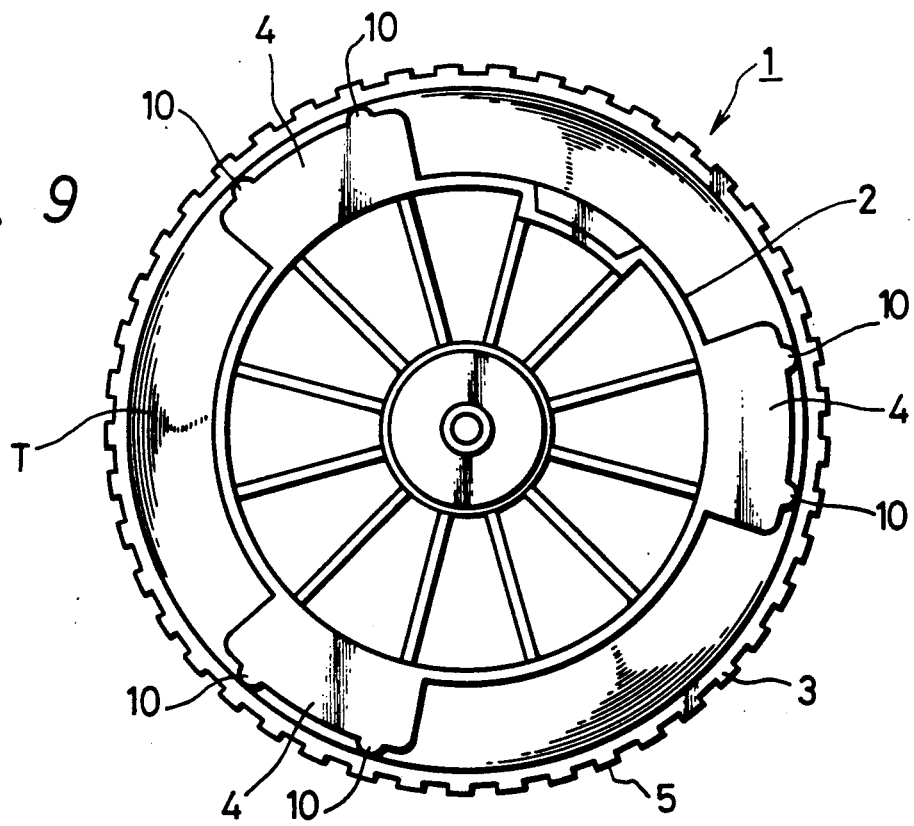
FIG. 9 is a plan view of a tape cassette reel of the present invention, showing a magnetic tape wound around the reel hub.
Figure 10:
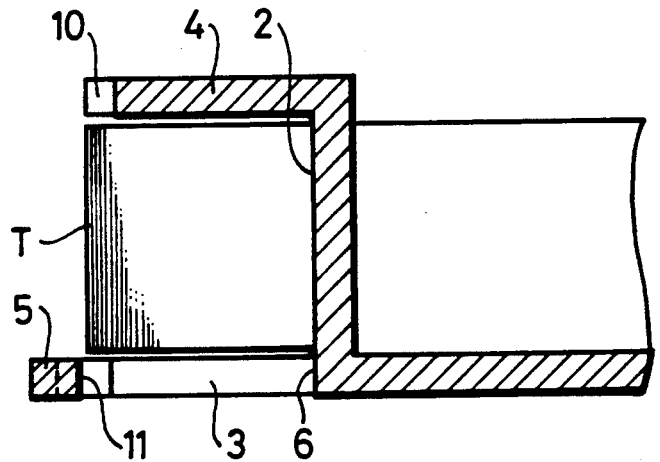
FIG. 10 is a longitudinal, cross-section side view of FIG. 9.

In the tape cassette reel of this embodiment as described above, the wound surface (i.e. the wound diameter) of the magnetic tape T is sufficiently covered and restricted by the protrusions 10 even when the magnetic tape T is wound at maximum around a reel hub 2 (see FIGS. 9 and 10). Thus, even when the tape cassette is inadvertently subjected to shock or vibration, the magnetic tape T is prevented from slipping past the upper flange 4. There is then no risk that the magnetic tape T will be damaged.

In the reel hub of the tape cassette reel of the present invention, by forming the protrusion 10 in a semicircular shape on the upper flange 4 at a position corresponding to a convex portion of the engaging teeth 5, it is possible to maintain enough width of the peripheral portion of the lower flange 3 adjacent to the opening portion 6 so that the strength of the lower flange 3 is not significantly lowered.

In this manner the tape cassette reel of the present invention is inured against the shock of being dropped or vibrated.

While the number of upper flanges 4 and opening portions 6 is three each in the above-mentioned embodiment, the number of upper flanges and opening portions may instead each be one, two, or more than four. Further, the shape of the protrusion 10 need not be the above-mention semicircular, but may instead be any suitable shape.

According to the tape cassette reel of the present invention, as described above, since a protrusion is formed on the outer peripheral portion of the upper flange so as to compensate for the short outer diameter of the upper flange, the wound length of the magnetic tape can be sufficiently guarded even when the magnetic tape is fully wound around a reel hub. Thus, the magnetic tape wrapped around the reel hub can be prevented from slipping off, making it possible to positively prevent the magnetic tape from being damaged.

A preferred embodiment of the present invention with reference to the attached drawings having been described, it is to be understood that the present invention is not limited to that precise embodiment and that various changes and modifications can be effected by one skilled in the art without departing from the spirit or scope of the novel concepts of the invention as defined in the appended claims.

I claim as my invention:

1. A tape cassette reel of the type having a reel hub and upper and lower flanges which are integrally molded on upper and lower ends of the reel hub, said upper flange being formed in correspondence with an opening portion formed trough said lower flange, wherein the improvement comprises:
   at least one protrusion of a predetermined shape formed on a portion of the outer periphery of said upper flange and which protrudes form significantly less than the entire periphery of said upper flange.

2. A tape cassette reel according to claim 1, in which said lower flange has engaging teeth formed around an outer peripheral potion thereof.

3. A tape cassette reel according to claim 2, in which said protrusion is formed on the outer peripheral portion of said upper flange at a position corresponding to a protruding portion of said engaging teeth.

4. A tape cassette reel according to claim 1, in which the predetermined shape of said protrusion is semicircular.

5. A tape cassette reel according to claim 1, in which there are two of such protrusions.

6. A tape cassette reel according to claim 1, in which at least one concave portion is formed in the opening portion of said lower flange at a position corresponding to that of said protrusion.

7. A tape cassette reel according to claim 6, in which the predetermined shape of said protrusion is semicircular.

8. A tape cassette reel according to claim 7, in which the shape of said concave portion is selected to be semicircular in correspondence with that of said protrusion.

9. A tape cassette reel according to claim 8, in which there are two each of said protrusions and concave portions.

10. A tape cassette reel according to claim 8, in which there are a plurality of said protrusions and concave portions, with the number of protrusions being equal to the number of concave portions.

11. A tape cassette reel according to claim 1, in which there are a plurality of said protrusions.

12. A tape cassette reel of the type having a reel hub and upper and lower flanges which are integrally molded on upper and lower ends of the reel hub, said upper flange being formed in correspondence with an opening portion formed through said lower flange, and wherein said lower flange has engaging teeth formed around an outer peripheral portion thereof, wherein the improvement comprises:

at least one protrusion of a predetermined shape formed on an outer peripheral portion of said upper flange at a position corresponding to a protruding portion of said engaging teeth.

13. A tape cassette reel according to claim 12, in which there are two of said protrusions.

14. A tape cassette reel of the type having a reel hub and upper and lower flanges which are integrally molded on upper and lower ends of the reel hub, and said upper flange being formed in correspondence with an opening portion formed through said lower flange, wherein the improvement comprises:

a plurality of protrusions of a predetermined shape formed on an outer peripheral portion of said upper flange and which protrude from significantly less than the entire periphery of said upper flange.

15. A tape cassette reel of the type having a reel hub and upper and lower flanges which are integrally molded on upper and lower ends of the reel hub, and said upper flange being formed in correspondence with an opening portion formed through said lower flange, wherein the improvement comprises:

at least one protrusion of a predetermined shape formed on an outer peripheral portion of said upper flange which is less than the entire periphery of the upper flange, and at least one concave portion, having a shape and size corresponding to the shape and size of said protrusion, formed in the opening portion of said lower flange at a position corresponding to that of said protrusion.

16. A tape cassette reel according to claim 15, in which the predetermined shape of said protrusion is semicircular.

17. A tape cassette reel according to claim 16, in which the shape of said concave portion is selected to be semicircular in correspondence with that of said protrusion.

18. A tape cassette reel according to claim 17, in which there are two each of said protrusions and concave portions.

19. A tape cassette reel according to claim 17, in which there are a plurality of said protrusions and concave portions, with the number of protrusions being equal to the number of concave portions.

20. A tape cassette reel according to claim 15, in which there are a plurality of said protrusions and concave portions, with the number of protrusions being equal to the number of concave portions.

* * * * *